United States Patent
Spofford

(10) Patent No.: US 10,709,242 B2
(45) Date of Patent: Jul. 14, 2020

(54) APPLIANCE WITH A BASE WALL HAVING A CONTACT SURFACE INCLUDING AT LEAST THREE INTERNAL LEVELING EXTENSION PLATFORMS AND METHOD OF USE

(71) Applicant: Charles James Spofford, Greenfield, MA (US)

(72) Inventor: Charles James Spofford, Greenfield, MA (US)

(*) Notice: Subject to any disclaimer, the term of this patent is extended or adjusted under 35 U.S.C. 154(b) by 38 days.

(21) Appl. No.: 15/914,437

(22) Filed: Mar. 7, 2018

(65) Prior Publication Data

US 2018/0206638 A1    Jul. 26, 2018

Related U.S. Application Data

(60) Provisional application No. 62/469,068, filed on Mar. 9, 2017.

(51) Int. Cl.
| | |
|---|---|
| A47B 91/08 | (2006.01) |
| A47B 55/00 | (2006.01) |
| D06F 39/12 | (2006.01) |
| E03D 11/16 | (2006.01) |
| E03C 1/328 | (2006.01) |
| F16M 7/00 | (2006.01) |

(52) U.S. Cl.
CPC .............. *A47B 91/08* (2013.01); *A47B 55/00* (2013.01); *D06F 39/125* (2013.01); *E03C 1/328* (2013.01); *E03D 11/16* (2013.01); *F16M 7/00* (2013.01)

(58) Field of Classification Search
CPC ..... Y10T 292/71; Y10T 292/72; A47B 91/08; A47B 91/10; A47B 91/12; A47K 1/02; A47K 1/04; A47K 1/05; E03C 1/18; F16M 7/00; F16B 13/0891; B23Q 1/58
USPC .............. 248/188.2, 649; 52/126.1; 254/104
See application file for complete search history.

(56) References Cited

U.S. PATENT DOCUMENTS

| | | | | |
|---|---|---|---|---|
| 1,575,162 A | * | 3/1926 | Hathorne | A47B 91/08 248/501 |
| 2,146,939 A | * | 2/1939 | Coordes | A47K 1/02 312/228 |
| 2,524,961 A | * | 10/1950 | Cramer, Jr. | F01B 17/04 254/104 |
| 3,652,044 A | * | 3/1972 | Manross | F16M 7/00 248/657 |
| 3,680,154 A | * | 8/1972 | Stairs | E03D 11/16 4/420 |
| 3,785,167 A | * | 1/1974 | Sahs | F25D 23/006 62/296 |

(Continued)

OTHER PUBLICATIONS

Oatley, Toilet Base Plate, Oct. 2005, downloaded from https://www.oatey.com/ASSETS/DOCUMENTS/ITEMS/EN/Toilet_Base_Plate.pdf on Feb. 28, 2018.

(Continued)

*Primary Examiner* — Erin Deery
(74) *Attorney, Agent, or Firm* — Richard A. Baker, Jr.

(57) ABSTRACT

An apparatus and method for easily and permanently leveling an appliance is described. The apparatus involves a modification to the appliance to support shims, and preferably the two-part adjustable leveling shims. Alternatively, a template for affixing two-part adjustable leveling shims is used between the appliance and the mounting surface.

5 Claims, 4 Drawing Sheets

(56) References Cited

U.S. PATENT DOCUMENTS

| | | | |
|---|---|---|---|
| 3,954,244 A * | 5/1976 | Gopstein | B23Q 1/54 |
| | | | 248/349.1 |
| 4,592,402 A | 6/1986 | Spofford | |
| 4,713,922 A * | 12/1987 | Ingold | E06B 1/6069 |
| | | | 254/104 |
| D332,829 S * | 1/1993 | Belfor | 4/646 |
| 6,581,251 B2 | 6/2003 | Malin | |
| 7,156,431 B2 * | 1/2007 | Norgaard | E06B 1/6069 |
| | | | 254/104 |
| 7,357,364 B2 | 4/2008 | Jackson et al. | |
| 7,703,727 B2 | 4/2010 | Selness | |
| 8,136,308 B2 | 3/2012 | Slott et al. | |
| 8,813,437 B1 | 8/2014 | Spofford | |
| 9,297,157 B2 * | 3/2016 | Wendorff | E03D 11/16 |
| 2003/0145531 A1 * | 8/2003 | Holder | E04F 13/0853 |
| | | | 52/98 |
| 2011/0198553 A1 * | 8/2011 | Holterman | E04H 12/2284 |
| | | | 248/188.2 |

OTHER PUBLICATIONS

EZ-Shim, Johnny Shim JS 500 BP, downloaded from http://www.ezshim.com/products/johnnyshim/index.html on Feb. 28, 2018.
Home Depot, Everbilt Toilet Shims, downloaded from https://www.homedepot.com/p/Everbilt-Toilet-Shims-4-Pack-88523/205172157?MERCH=REC-_-PIPHorizontal2_rr-_-205854580-_-205172157-_-N on Feb. 28, 2018.

\* cited by examiner

APPLIANCE WITH A BASE WALL HAVING A CONTACT SURFACE INCLUDING AT LEAST THREE INTERNAL LEVELING EXTENSION PLATFORMS AND METHOD OF USE

CROSS REFERENCE TO RELATED APPLICATIONS

This application is a non-provisional Application, for which priority is claimed under 35 U.S.C. § 119, of U.S. Provisional Patent Application No. 62/469,068, filed Mar. 9, 2017, and entitled "An Appliance with a Base Wall having a Contact Surface Including at Least Three Internal Levelling Extension Platforms and Method of Use," the entire content of the above provisional patent application is incorporated herein by reference in its entirety.

BACKGROUND

Technical Field

This disclosure relates to appliances, such as toilets, pedestal sinks, etc., and a form of the appliances to facilitate level mounting and long-term maintenance of a level mounting of the appliance upon a floor.

Description of the Related Art

It is known that appliances mounted upon floors, such as toilets, pedestal sinks, etc., must be mounted so that a bottom support surface of the appliance is level, meaning parallel to a plane that is perpendicular to the direction of the force of gravity. (For purposes herein, the word "level" is to mean that a "level surface" defines a plane that is perpendicular to the direction of the force of gravity. Also for purposes herein, the word "plumb" is to mean that a "plumb surface" is parallel to the direction of gravity.) Additionally, the word "appliance" is intended herein to include a wide variety of pre-constructed apparatus that must be secured to either horizontal, floor-like locations, or to vertical, wall-like locations. For example, "appliances" includes the aforesaid toilets, pedestal sinks, bath tubs, and also cabinetry of all sorts, platforms that could support a mini-split HVAC unit mounted to an exterior wall of a structure, electric motor bases, air conditioners, washing machines, dryers, stoves, ovens, dishwashers, refrigerators, freezers, furnaces, aquariums, and any other pre-manufactured apparatus that could be set or secured to the ground, a floor or a wall. In addition, many types of industrial equipment require level installation, and would benefit from these inventions, such as milling machines, lathes, 3D printers, centrifuges, air compressors, etc.

Mounting an appliance on a level floor or plumb wall is not a problem. However, it is also well known that many floors and/or walls of older structures are not level. In such circumstances, it is common to mount the appliance in a desired location, and then hammer in one or two levelling shims to raise a side of the appliance to be level with an opposed side. The levelling shims are slender, long, triangular structures that are well known in the construction and mechanical trades. This gives rise to many problems, including disruption of mounting seals or gaskets, such as are used with toilets. Additionally, a very narrow point of contact between the contact surface of a base wall rests upon a non-level shim surface so that the contact surface tends to slide down the shim over time, to move the appliance out of being level. Additionally, any excess shim extending beyond a perimeter of the mounted appliance has to be cut off by a sharp, hard instrument, such as a knife, which raises a risk of damage to the exterior surface of the appliance.

The inventor, in his earlier work, "Integral shim-pack with an adjustable pull tang", U.S. Pat. No. 8,813,437 (hereby incorporated by reference), addressed the problem of leveling doors and windows. This present invention expands upon that patent to provide the benefits to the installation of appliances or other equipment.

The present invention, eliminates the issues articulated above as well as other issues with the currently known products.

SUMMARY OF THE INVENTION

An appliance with a base wall for securing the appliance to a support is disclosed, the appliance comprising a base wall surrounding one of partially or completely a void, the base wall having an exterior surface and an opposed interior surface, a contact surface extending between ends of the exterior and interior surface of the base wall, the contact surface being configured to secure the appliance to the support; and at least three interior extension platforms extending from the contact surface into the void, the at least three interior extension platforms located adjacent points on the contact surface so that the three interior extension platforms define a stable, planar foundation for the appliance.

The appliance could be a toilet, a cabinet, an air conditioner, or a similar appliance.

The contact surface could be the female base of a two-part shim, and the shim could be adjustable. The contact base could also be capable of receiving an attachment device such as a nail or screw.

A method for securing an appliance to a surface is also disclosed. The method comprises preparing the surface for the installation of the appliance, attaching a shim to the surface, placing the appliance on the surface, wherein the appliance has at least three interior extension platforms, and the at least three interior extension platforms align with the location of the shims; and leveling the appliance by adjusting the shims.

The shims could be a two part shim, and could be adjustable with a pull tang. The appliance could be a toilet, a pedestal sink, or an electric motor base.

DETAILED DESCRIPTION OF THE INVENTION

Figure 1:
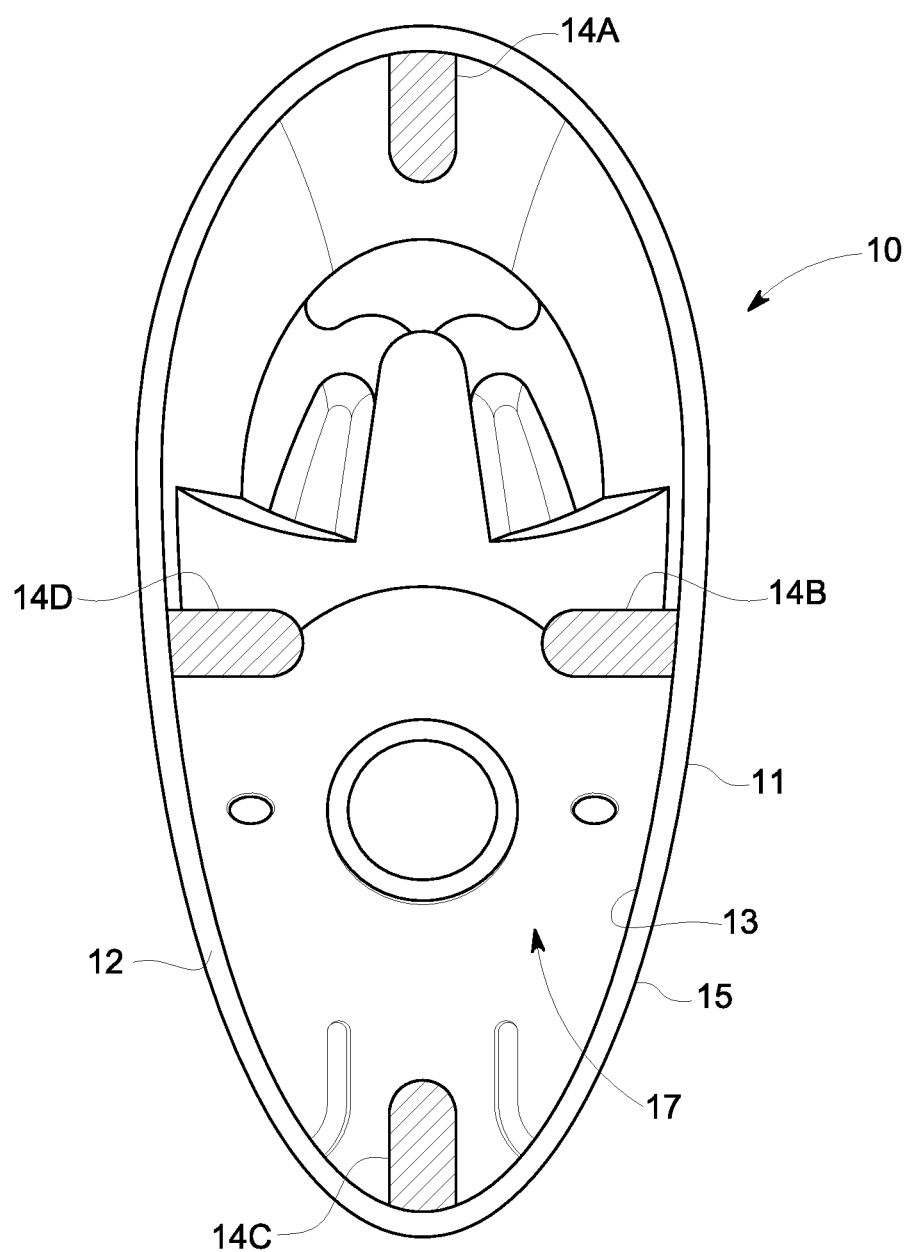
FIG. 1 shows the underside of an appliance, in this case a toilet, indicating the possible location of interior extension platforms.

FIG. 1 is bottom view of a typical floor-mounted appliance (namely a toilet in one embodiment) that is designated by the reference numeral 10. The appliance 10 includes a base wall 11 having an interior surface 13 and an opposed exterior surface 15. The base wall 11 surrounds or partially surrounds a void 17. A contact surface 12 extends between ends of the interior surface 13 and the exterior surface 15 of the base wall 11. The contact surface 12 is configured to contact a support, such as a support floor or wall 22, shown in FIG. 2. The contact surface 12 includes at least three interior extension platforms 14A, 14B, 14C and 14D extending from the contact surface 12 into the void 17. The interior extension platforms are located adjacent points on the contact surface 12 so that the three interior extension platforms 14A-14D define a stable, planar foundation for the appliance 10. In other words, the interior extension platforms 14A-14D, when contacting the support floor 22, prevent the appliance from tipping, and instead, the appliance is mounted in a stable disposition.

Figure 2:
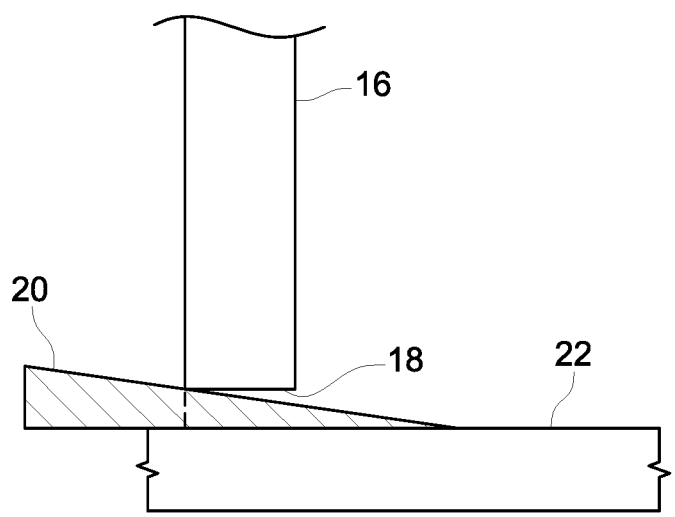
FIG. 2 shows the prior art use of shims to support an appliance.

FIG. 2 shows a sectional, fragmentary view of a prior art appliance 16 having a contact surface 18 that does not include an interior extension platform. A typical elongate, narrow, triangular-shaped shim 20 is shown between a floor 22 and the contact surface 18, so that the levelling shim 20 raises a side of the appliance floor contact surface 18 above the floor 22 so that the contact surface 18 is level. FIG. 2 also shows that the contact surface 18 has a single point of contact with the angular upper surface of the shim 20. As discussed above, gravity tends to force the contact surface 18 to slowly move downward over time, to make the appliance 16 no longer level.

Figure 3:
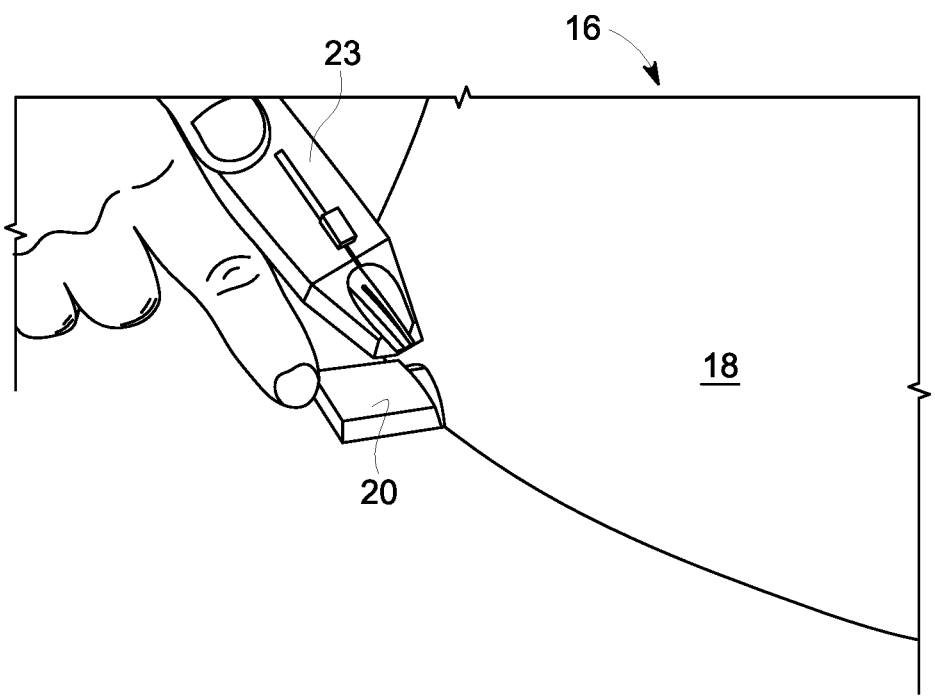
FIG. 3 shows the use of shims to support the appliance from an exterior view.

FIG. 3 shows a portion of the FIG. 2 shim 20 extending beyond the contact surface 18 of the FIG. 2 appliance 16. To finish installation on the appliance 16, after it is mounted upon the shim 20, the extending portion must be removed, such as by cutting by a knife 23. This gives rise to a risk of damage to the contact surface 18 by the knife 23 during the cutting. It is known that an outer surface of a contact surface 18 typically includes a specific color that is an important aspect of the appliance 16. Therefore, any damage to the colored surface of the appliance 16 is a great loss aesthetically.

Figure 4:
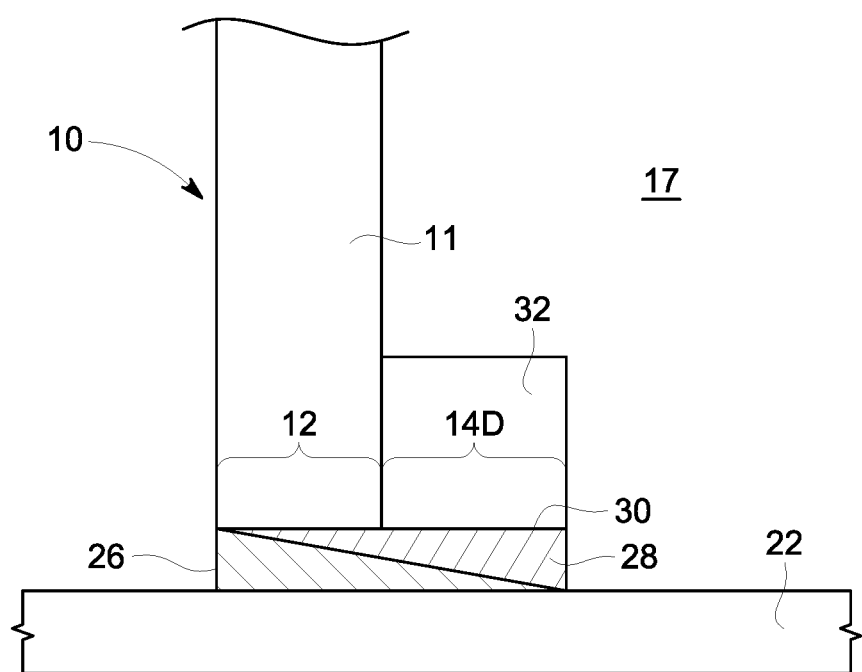
FIG. 4 shows the sectional view of the appliance including the contact surface and the interior extension platform.

FIG. 4 shows a fragmentary, sectional view of the FIG. 1 appliance 10 including the contact surface 12 and interior extension platform 14D shown in FIG. 1 that is defined extending from the contact surface 12 into the void 17 defined by the base wall 11. Shown positioned adjacent the interior extension platform 14D is a preferable two-piece levelling shim (see U.S. Pat. No. 8,813,437), wherein a bottom shim portion 26 contacts the floor 22 and an upper shim portion 28 is secured between the bottom shim portion 26 and the interior extension platform 14D. When the two-piece levelling shim 26,28 is utilized, as is well known, varying the positions of the bottom shim portion 26 and upper shim portion 28 varies an overall thickness of the two-piece shim, and also provides a flat, top surface 30 on the top of the upper shim portion 28 to avoid any tendency of the appliance floor contact surface 12 moving along the shim 24 to take the appliance 10 out of a level disposition.

In use of the floor-mounted appliance 10 having at least three interior extension platforms 14A-14C defined to extend from the contact surface 12, one may use a template (not shown) that matches the dimensions of contact surface 12 and interior extension platforms the 14A, 14B, 14C and 14D of the appliance 10. The template is positioned upon the floor 22 to which the appliance 10 is to be mounted. Then, extension platform positions (not shown) in the template (not shown), at least one single shim 20, or preferably one or more two-piece shims 26,28 may be positioned and adjusted to be level at an exterior perimeter of a contact surface outline (not shown) drawn in the template. The shims 26,28 are then secured to the floor, and any portions of the shims 26,28 extending beyond the exterior perimeter of the contact surface outline in the template are cut off, prior to mounting the appliance 10 so that the shims are aligned to contact the interior extension platforms 14A-14D. Use of the elongate shims 26,28 adjacent the interior extension platform 14A-14D provides for usage of the two-piece shims 26,28 prior to mounting the appliance 10. Therefore, there is no risk of damage to any seal used between the appliance 10 and the support floor 22 or any support wall (not shown).

In one embodiment, the base (female) component of the adjustable, two piece shim 26,28 could be included in the mold of the template at the location of the several interior extension platforms 14A-14D. Thus only the male shim needs to be supplied with the template, and the male shim integrated with the female portion on the template to adjust the width of the shim 26,28 and thus the level of the template (or the appliance). In an alternate embodiment, the male shim could be included in the mold of the template with the female portion separate. The location of the shims 26,28 as molded in the template could be located anywhere without taking away from the invention FIG. 4 also shows that the interior extension platform 14D may include additional structural integrity with a platform block 32 that extends over and above the upper portion 28 of the two-piece shim 24 to provide even more stable support for the appliance 10.

While the present disclosure has been presented above with respect to the described and illustrated embodiments of the appliance 10 having at least three interior extension platforms 14A-14D defined within the contact surface of the appliance 10, it is to be understood that the disclosure is not to be limited to those alternatives and described embodiments. Accordingly, reference should be made primarily to the following claims rather than the forgoing description to determine the scope of the disclosure.

The foregoing devices and operations, including their implementation, will be familiar to, and understood by, those having ordinary skill in the art.

The above description of the embodiments, alternative embodiments, and specific examples, are given by way of illustration and should not be viewed as limiting. Further, many changes and modifications within the scope of the present embodiments may be made without departing from the spirit thereof, and the present invention includes such changes and modifications.

The invention claimed is:

1. An appliance with a base wall for securing the appliance to a support, the appliance comprising:
   the base wall surrounding, one of partially or completely, a void, the base wall having an exterior surface and an opposed interior surface;
   a contact surface extending between ends of the exterior and interior surface of the base wall, the contact surface being configured to secure the appliance to the support;
   at least three interior extension platforms extending from the contact surface into the void, the at least three interior extension platforms located adjacent points on the contact surface so that the at least three interior extension platforms define a level, stable, planar foundation for the appliance; and
   a template at a location of the at least three interior extension platforms wherein the template is molded to include at least one portion of a two-part shim.

2. The appliance of claim 1 wherein the appliance is a toilet.

3. The appliance of claim 1 wherein the appliance is a cabinet.

4. The appliance of claim 1 wherein the two-part shim is adjustable.

5. The appliance of claim 1 wherein the contact surface is capable of receiving an attachment device.

\* \* \* \* \*